(12) United States Patent
Yu et al.

(10) Patent No.: US 12,353,556 B2
(45) Date of Patent: Jul. 8, 2025

(54) INTELLIGENT SWITCHING TO A DEBUG LOAD OPERATION FOR AN ELECTRONIC DEVICE

(71) Applicant: ARRIS Enterprises LLC, Suwanee, GA (US)

(72) Inventors: Carry Yu, Guangdong (CN); Sara Lu, Guangdong (CN); Karen Dong, Guangdong (CN)

(73) Assignee: ARRIS Enterprises LLC, Suwanee, GA (US)

( * ) Notice: Subject to any disclaimer, the term of this patent is extended or adjusted under 35 U.S.C. 154(b) by 473 days.

(21) Appl. No.: 17/913,959

(22) PCT Filed: Apr. 8, 2020

(86) PCT No.: PCT/CN2020/083660
§ 371 (c)(1),
(2) Date: Sep. 23, 2022

(87) PCT Pub. No.: WO2021/203266
PCT Pub. Date: Oct. 14, 2021

(65) Prior Publication Data
US 2023/0125154 A1    Apr. 27, 2023

(51) Int. Cl.
*G06F 21/57*   (2013.01)
*G06F 8/65*    (2018.01)
*G06F 11/362*  (2025.01)

(52) U.S. Cl.
CPC .............. *G06F 21/572* (2013.01); *G06F 8/65* (2013.01); *G06F 11/362* (2013.01); *G06F 2221/033* (2013.01)

(58) Field of Classification Search
CPC ........ G06F 21/572; G06F 8/65; G06F 11/362; G06F 2221/033
See application file for complete search history.

(56) References Cited

U.S. PATENT DOCUMENTS

| | | | |
|---|---|---|---|
| 2009/0010175 A1* | 1/2009 | Underwood | H04L 45/56 370/252 |
| 2012/0216079 A1* | 8/2012 | Fai | G06F 11/362 714/E11.055 |
| 2014/0122727 A1* | 5/2014 | Miner | H04L 45/60 709/227 |

OTHER PUBLICATIONS

International Search Report and the Written Opinion of the International Searching Authority dated Dec. 30, 2020 in International (PCT) Application No. PCT/CN2020/083660.

* cited by examiner

*Primary Examiner* — Kevin Bechtel
*Assistant Examiner* — Forrest L Carey
(74) *Attorney, Agent, or Firm* — Chernoff, Vilhauer, McClung & Stenzel, LLP (57) ABSTRACT

An apparatus, system, method, and computer-readable recording medium perform intelligent upgrade to a debug load operation in an electronic device. A key is set in advance via a Management Information Base (MIB), which defines execution of a debug load operation for the electronic device. When a debug load operation is requested, the electronic device validates the key via the MIB, and sets a time period for execution of the debug load operation. The electronic device upgrades from an official release load operation to the debug load operation and executes the debug load operation. After the expiration of the time period, the electronic device automatically upgrades back to the official release from the debug load operation in the electronic device after expiration. The debug load operation collects information related to the electronic device and transmits the information to an external server for storage.

20 Claims, 3 Drawing Sheets

INTELLIGENT SWITCHING TO A DEBUG LOAD OPERATION FOR AN ELECTRONIC DEVICE

TECHNICAL FIELD

The subject matter of the present disclosure relates generally to the implementation of a debug load operation for determining performance issues with an electronic device such as a cable modem or gateway device.

BACKGROUND

Wireless networks for providing, services to client devices or end devices via a modem or gateway device are prevalent in many homes and businesses. Additionally, there can be several modems or gateway devices deployed in the home or business to enhance quality of service (QoS) in the network.

However, sometimes there can be problems with the operation of the modem or gateway device that interrupt services. For example, the modem and gateway device can stop working or exhibit glitches.

Currently, there are limited ways for technical support personal to be able to quick and efficiently debug a modem or gateway device. For example, the technical support personal are generally required to get assistance from an engineer and/or product line manager (PLM) for defining and approving a debug load operation prior to being performed on the modem or gateway device.

Getting assistance from an engineer and/or PLM prior to performing a debug load operation on the modem or gateway device can cause delays and increase down time, which can negatively affect QoS in the network.

Thus, it would be advantageous and an improvement over the relevant technology to provide an apparatus, system, method, and computer-readable recording medium capable of quickly and efficiently performing a debug load operation on a modem or gateway device without requiring assistance from an engineer or PLM.

SUMMARY

An aspect of the present disclosure provides an electronic device for the intelligent upgrade to a debug load operation. The electronic device includes a hardware processor, a non-transitory main memory configured to store one or more programs, and a network interface. The hardware processor is configured to execute the one or more programs to verify validity of a key via a Management Information Base (MIB), the key being set in advance via the MIB and defining execution of the debug load operation for the electronic device. The hardware processor is also configured to execute the one or more programs to set a time period for execution of the debug load operation, when the validity of the key is verified; and upgrade from an official release operation to the debug load operation in the electronic device and execute the debug load operation in the electronic device. The electronic device is automatically upgraded hack to the official release operation frons the debug load operation after expiration of the time period. The debug load operation collects information related to the electronic device and transmits the information to an external server for storage via the network interface.

The key includes at least: 1) a time for upgrading to the debug load operation; 2) a time for upgrading back to the official release operation; 3) a Multiple System Operator (MSO) name; 4) a model number and 5) a hash encryption field. The key can be verified using at least the MSO name, the model number, and the hash encryption field.

In an aspect of the present disclosure, the debug load operation triggers the execution of applets or scripts for collecting the information related to the electronic device, and the information collected by execution of the debug load includes data packets and logs related to operations of the electronic device. In an aspect of the present disclosure, the electronic device can be a cable modem and the external server can be a low server.

An aspect of the present disclosure provides a system for the intelligent upgrade to a debug load operation. The system includes a management server including, a network interface, a hardware processor, and a non transitory memory configured to store one or more programs; an electronic device including a hardware processor, a non-transitory memory configured to store one or more programs, and a network interface; a log server including a hardware processor, a non-transitory memory configured to store one or more programs, and a network interface; and a network connection configure to establish a communication connection between respective network interfaces of the management server, the electronic device, and the log server.

The respective hardware processors in the management server, the electronic device, and the log server execute their respective one or more programs to cause the system to set, using the management server, a key via a Management Information Base (MIB), the key being set in advance and defining execution of a debug load operation for the electronic device; and initiate a request for the debug load operation related to the electronic device via the network connection. The request for the debug load operation can be related to a performance issue detected for the electronic device. Additionally, in the electronic device, validity of the key is verified via the MTB; and a time period is set for the execution of the debug load operation, when the validity of the key is verified.

Additionally, the respective hardware processors in the management server, the electronic device, and the log server execute their respective one or more programs to, in the electronic device, upgrade from an official release operation to the debug, load operation and execute the debug load operation; and automatically upgrade back to the official release operation from the debug load operation after expiration of the time period. The debug load operation collects information related to the electronic device and transmits the information to a log server via the network connection for storage.

An aspect of the present disclosure provides a method for the intelligent upgrade to a debug load operation for an electronic device. The method includes setting a key via a Management Information Base (MIB), the key being set in advance and defining execution of a debug load operation for the electronic device; initiating a request for the debug load operation related to the electronic device; and verifying validity of the key via the MIB.

Additionally, the method includes setting a time period for execution of the debug load operation, when the validity of the key is verified; upgrading from an official release operation to the debug load operation in the electronic device and executing the debug load operation; and automatically upgrading back to the official release operation from the debug load operation in the electronic device after expiration of the time period. The debug load operation collects information related to the electronic device and transmits the information to an external server for storage.

The key can include: 1) a time for upgrade, to the debug load operation; 2) a time to upgrade back to the official release operation; 3) a Multiple System Operator (MSO) name; 4) a model number; and 5) a hash encryption field. The verifying of the validity of the key can include verifying at least the MSO name, the model number, and the bash encryption field with respect to the electronic device.

The executing the debug load operation for the electronic device includes triggering execution of applets or scripts, and the information collected by execution of the debug load includes data packets and logs related to operations of the electronic device. The electronic device is a cable modem.

An aspect of the present disclosure provides a non-transitory computer-readable recording medium for the intelligent upgrade to a debug load operation. The non-transitory computer-readable recording medium stores one or more programs which when executed by a hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined ley the appended claims and their equivalents.

Figure 1:
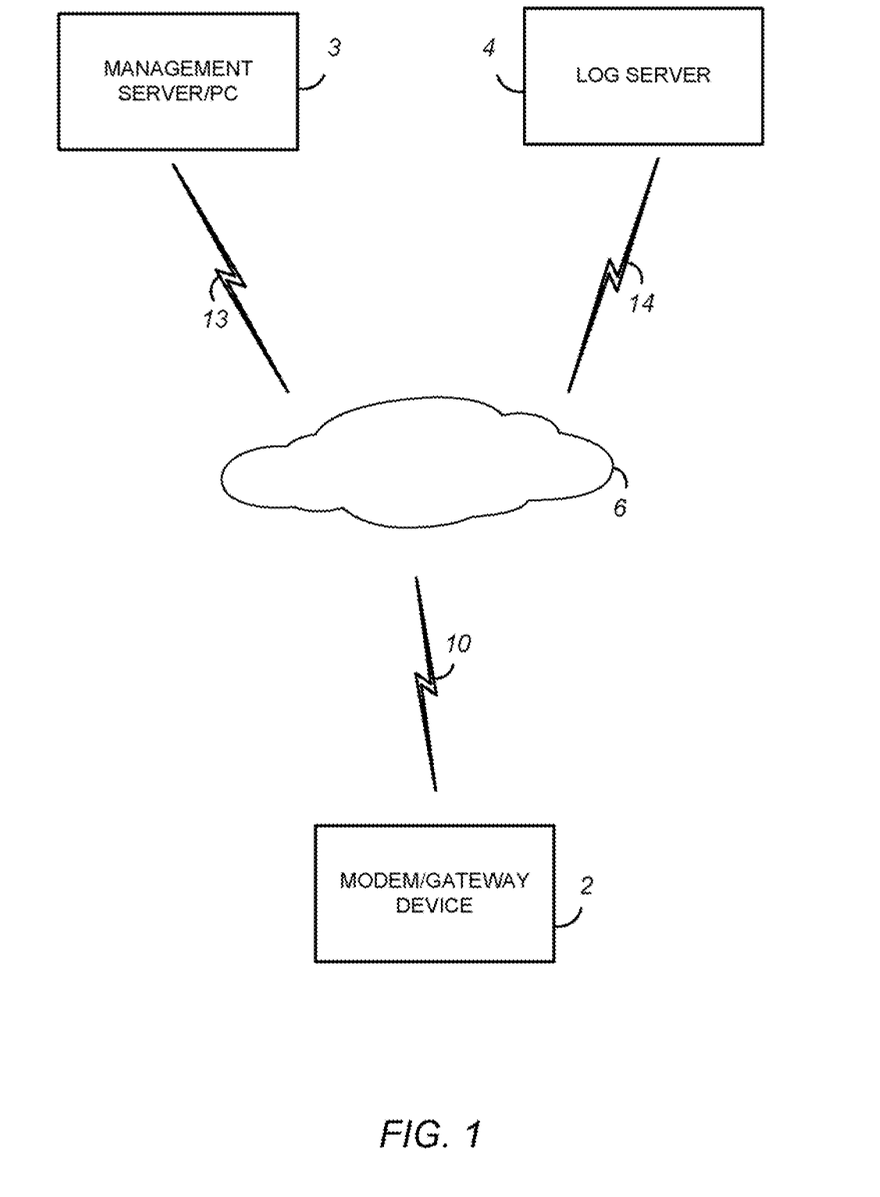
FIG. 1 is a schematic diagram of a system fair intelligent upgrade to a debug load operation in an electronic device according to an embodiment of the present disclosure.

FIG. 1 is a schematic diagram of as system for the intelligent upgrade to a debug load operation in an electronic device according to an embodiment of the present disclosure. As shown FIG. 1, the system includes as management server or personal computer (PC) 3 and a log server 4 connected to a modem/gateway device 2 via the Internet 6.

Starting from the top-left of FIG. 1, the management server/PC 3 may be any type of server or network computer implemented as a management device for communicating, monitoring, and managing other devices (e.g., router, modems, switches, servers gateway and other similar devices) connected in a network using a management protocol. For example, the management server/PC 3 can be a simple network management protocol (SNMP) management device implementing the use of an SNMP protocol. The SNMP protocol is an Internet standard protocol for collecting, organizing, and modifying information for the managed devices in the network. The managed devices router, modems, switches, servers, gateway and other similar devices) by the management server/PC 3 would also support the use of the same or similar protocol such as the SNMP protocol.

By using a management protocol such as the SNMP protocol, the management server/PC 3 can send queries, receive responses, set variables, and monitor and acknowledge events with respect to the managed devices. The management server/PC 3 can implement the use of management software or agent (e.g., NET-SNMP or MG-SOFT) for performing communicating, monitoring, and management functions related to the managed devices.

The connection 13 between the management server/PC 3 and the Internet 6 can be implemented using a wide area network (WAN), a virtual private network (VPN), metropolitan area networks (MANs), system area networks (SANs), a public switched telephone network (PTSA), a global Telex network, or a 2G, 3G, 4G or 5G network.

The log server 4 may be any type of server or computer implemented as a network server or network computer for providing various shared resources to other devices connected to the network via the Internet 6. For example, in this case, the log server 4 can be implemented to store configuration data, data packets, logs, log files, or other data files related to the operation and activities performed by modem/gateway device 2 and/or other managed devices in the network. The configuration data, data packets, logs, log files, or other data files can be accessed by, for example, technical support persons, or, other administrative or management persons and/or devices. An analysis of the information stored in the log server 4 can be used to examine the operation and activities of the modem/gateway device 2 and other network devices connected in the network.

The connection 14 between the log server 4 and the Internet 6 can be implemented using a WAN, a VPN, MANs, SANs, a PTSA, a global Telex network, or a 2G, 3G, 4G or 5G network. The connection 10 between the Internet 6 and the modem/gateway device 2 can be implemented using a digital subscriber line (DSL) connection, a cable modem connection, a broadband Mobile phone network, an optical network, or other similar connections. The connection 10 can also be implemented using a wireless connection that operates in accordance with, but is not limited to, IEEE 802.11 protocol, a Radio Frequency For Consumer Electronics (RF4CE) protocol, ZigBee protocol, Z-Wave protocol, or IEEE 802.15.4 protocol. It is also contemplated by the present disclosure that connection 10 is capable of providing connections between the modem/gateway device 2 and a WAN, a LAN, a VPN, MANs, PANs, WLANs, SANs, a PTSA, a global Telex network, or a 2G, 3G, 4G or 5G network.

The modem/gateway device 2 can be a hardware electronic device that functions as a modem, a combined modem and router, or a combined modem, router, and gateway device for providing content received from, for example, a content provider to other network devices (e.g., client devices and/or mobile devices) in one of more wireless networks (not shown). It is also contemplated by the present disclosure that the modem/gateway device 2 can include the function of, but is not limited to, an Internet Protocol/ Quadrature Amplitude Modulator (IMAM) set-top box (STB) or smart media device (SMD) that is capable of decoding audio/video content, and playing over-the-top (OTT) or multiple system operator (MSO) provided content.

The modem/gateway device 2 may be connected to different wireless networks such as a guest network, a backhaul network, a private network, an iControl network and/or an Internet of Things (IoT) network, which may include one or more client devices and/or mobile, devices for receiving content from the content provider connected to the modem/ gateway device 2 via, for example, the internet 6.

It is contemplated by the present disclosure that the modem/gateway device 2 can communicate with one or more client devices and/or mobile devices connected in the different wireless networks using a wireless connection that operates in accordance with Bluetooth protocols (e.g. Bluetooth versions 1.0-3.0 and Bluetooth Low Energy (BLF) versions 4.0-5.0) or other short range protocols that operate in accordance with a wireless technology standard for exchanging data over short distances using short-wavelength UHF radio waves from 2.4 to 2.485 GHz.

Additionally, the modem/gateway device 2 can communicate with one or more client devices and/or mobile devices connected in the different wireless networks using a wireless connection that operates in accordance with, but is not limited to, IEEE 802.11 protocol, RF4CE protocol, ZigBee protocol, Z-Wave to protocol, or IEEE 802.15.4 protocol. The one or more slier ices and/or mobile devices can include, for example, a computer, a portable device, an electronic tablet, a smart phone, smart speakers, IoT devices, iControl devices, or other wireless hand-held consumer electronic device capable to executing and displaying the content received through the modem/gateway device 2. It is also contemplated by the present disclosure that modem/ gateway device 2 could include connections to a media over coax (MoCA) network.

Figure 2:
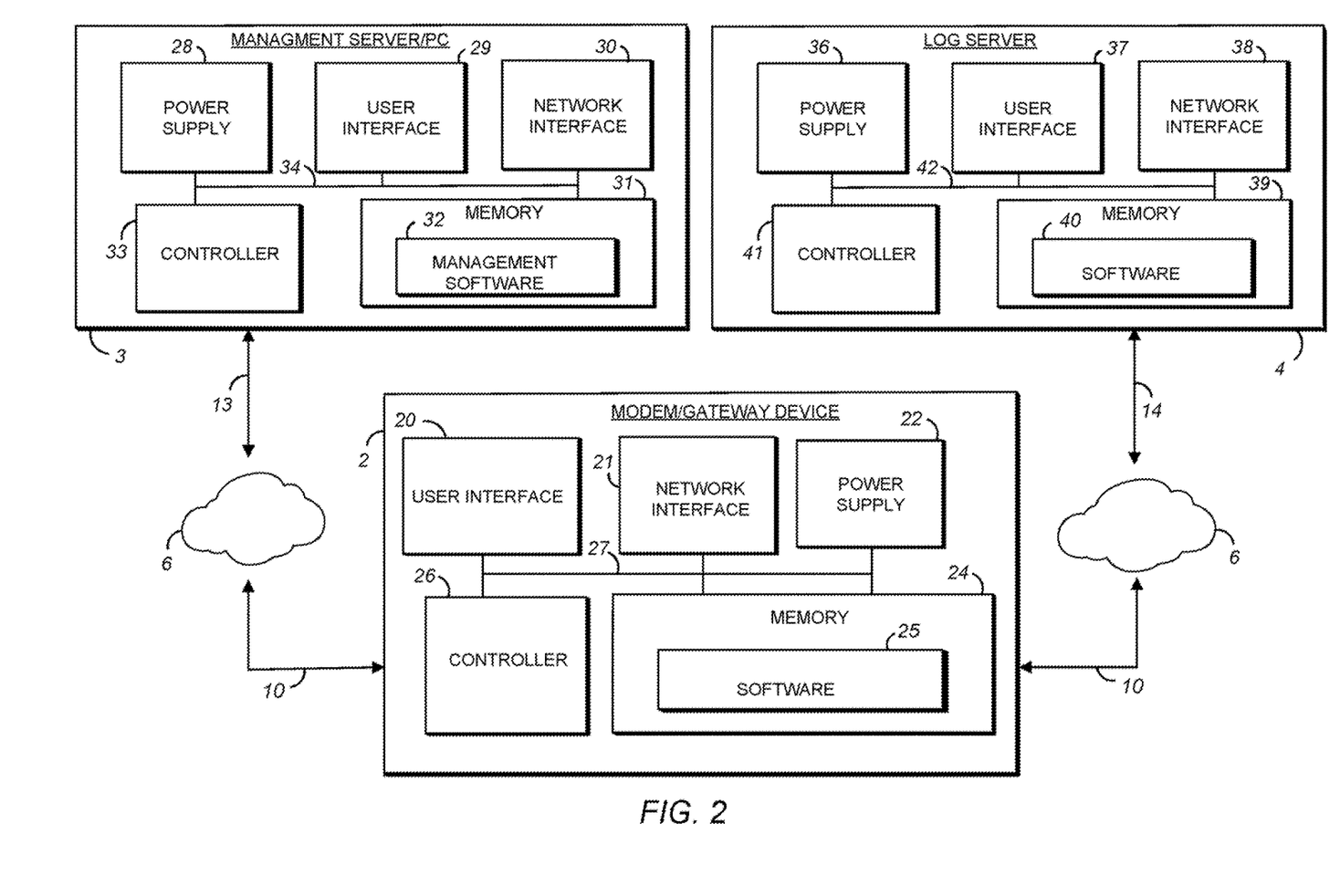
FIG. 2 illustrates is a more detailed schematic diagram management server/PC, modem/gateway device, and log server in the system of FIG. 1 according to an embodiment of the present disclosure.

A detailed description of the exemplary internal components of the management server/PC 3, log server 4, and modem/gateway device 2 shown in FIG. 1 will be provided in the discussion of FIG. 2. However, in general, it is contemplated by the present disclosure that the arrangement server/PC 3, log server 4, and modem/gateway device 2 include electronic components or electronic computing devices operable to receive, transmit, process, store, and manage data and information associated with the system, which encompasses any suitable processing device adapted to perform computing tasks consistent with the execution of computer-readable instructions stored in a memory or a computer-readable recording medium.

Further, any, all, or some of the computing devices in the management server/PC 3, log server 4, and modem/gateway device 2 may be adapted to execute any operating system, including Linux, UNIX, Windows, MacOS, DOS, and ChromOS as well as virtual machines adapted to virtualize execution of a particular operating system, including customized and proprietary operating systems. The management server/PC 3, log server 4, and modem/gateway device 2 are further equipped with components to facilitate communication with other computing devices over the one or more network connections to local and wide area networks, wireless and wired networks, public and private networks, and any other communication network enabling communication in the system.

FIG. 2 illustrates is a more detailed schematic diagram of the management server/PC 3, the log server 4, and the modem/gateway device 2 shown in FIG. 1 according to an embodiment of the present disclosure. Although, FIGS. 1 and 2 only show one management server/PC 3, one log server 4, and one modem/gateway device 2, it is contemplated by the present disclosure that more than one management server/PC 3, log server 4, and modem/gateway device 2 can be implemented. The management server/PC 3, log server 4, and modem/gateway device 2 shown in FIGS. 1 and 2 are meant to be representative of the network devices that can be implemented to achieve the features of the different aspects and embodiments of the present disclosure.

Now referring to FIG. 2 (e.g., from left to right), the management server/PC 3 may be any type of server or network computer implemented as a management device for communicating, monitoring, and managing other devices (e.g., router, modems, switches, servers, gateway and other similar devices) connected in a network using a management protocol.

As shown in FIG. 2, the management server/PC 3 includes a power supply 28, a user interface 29, a network interface 30, a memory 31, and a controller 33. The power supply 28 supplies power to the internal components of the management server/PC 3 through the internal bus 34. The power supply 28 can include a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiNH), a lithium-ion or a lithium Polymer (Li-ion) battery.

The user interface 29 can include, but is not limited to, push buttons, a keyboard, a keypad, a liquid crystal display (LCD), cathode ray tube (CRT), thin film transistor (TFT), light-emitting diode (LED), high definition (HD) or other similar display device including a display device having touch screen capabilities so as to allow interaction between a user and the management server/PC 3. The network interface 30 ca includes, but is not limited to, various network cards, interfaces, and circuitry implemented in software and/or hardware to enable communications between the management server/PC 3 and the Internet 6 using connection 13. The various network cards, interfaces and circuitry enable communications via connection 13 using a WAN, a VPN, MANs, SANs, a PTSA, a global Telex network, or a 2G, 3G, 4G or 5G network.

The memory 31 can include a single memory or one or more memories or memory locations that include, but are not limited to, a random access memory (RAM), dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy.

The memory 39 can be used to store any type of instructions including software such management software 32 or agent associated with algorithms, processes, or operations for controlling the general management and monitoring functions of the management server/PC 3 and associated with the intelligent upgrade to a debug load operation for the modem/gateway device 2. For example, management software 32 may include algorithms, processes, or operations for implementing an SNMP protocol, which is an Internet standard protocol for collecting, organizing, and modifying information for the managed devices in the network. For example, management software 32 may include NET-SNMP or MG-SOFT for performing communicating, monitoring, and management functions related to the modem/gateway device 2.

The managed devices (e.g. router, modems, switches, servers, gateway and other similar devices) by the management server/PC 3 can include the modem/gateway device 2, which would also support the use of the same or similar protocol such as the SNMP protocol. The SNMP protocol permits active management tasks, such as monitoring, management, and configuration changes, through the setting and modification of device or network variables. The device or network variables accessible via SNMP are organized in hierarchies described as a management information base (MIB). The MIB is a pre-defined structure that stores information such as the device or network variables that can be queried and/or set. The software 32 or agent is responsible for gathering information about network devices such as the modem/gateway device 2 and storing them in a format that can be queried and updated in the MIB.

The controller 33 controls the general operations of the management server/PC 3 and includes, but is not limited to, a central processing unit (CPU), a hardware microprocessor, a multi-core processor, a single core processor, a field programmable gate, array (FPGA), a microcontroller, an application specific integrated circuit (ASIC), a digital signal processor (DSP), or other similar processing device capable of executing any type of instructions, algorithms, or software for controlling the operation and performing the functions of the mobile device 5. General communication between the components (e.g., 28-33) of the management server/PC 3 is performed using the internal bus 43.

The log server 4 may be any type of server or computer implemented as a network server or network computer for providing various shared resources to other devices connected to the network via the Internet 6. As shown in FIG. 2, the log server 4 includes a power supply 36, a user interface 37, a network interface 38, a memory 39, and a controller 41.

The power supply 36 supplies power to the internal components of the log server 4 through the internal bus 42. The power supply 36 can include a self-contained power source such as a battery pack with an interface to be powered through an electrical charger connected to an outlet (e.g., either directly or by way of another device). The power supply 36 can also include a rechargeable battery that can be detached allowing for replacement such as a NiCd, a NiMH, a Li-ion, or a Li-pol battery.

The user interface 37 can include, but is not limited to, push buttons, a keyboard, a keypad, an LCD, a CRT, a TEL an LED, an HD or other similar display device including a display device having touch screen capabilities so as to allow interaction between a user and the log server 4. The network interface 38 can include various network cards, and circuitry implemented in software and/or hardware to enable communications between the log server and the Internet 6 using connection 14.

The various network cards, interfaces, and circuitry of the network interface 38 enable communications via connection 14. The various network cards, interfaces, and circuitry enable communications via connection 14 using a WAN, a VPN, MANs, SANs, a PTSA, a global Telex network, or a 2G, 3G, 4G or 5G network.

The memory 39 can include a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 39 can be implemented to store data, data packets, logs, log files, or other files related to the operation and activities performed by modem/gateway device 2 and/or other managed devices in the network. The configuration data, data packets, logs, log files, or other ides can accessed by, for example, technical support persons, a webmaster, or other administrative or management persons and/or devices. An analysis of the information stored in the log server 4 can be used to examine the operation and activities of the modem/gateway device 2 and other network devices connected in the network.

Additionally, the memory 39 can be used to store any type of instructions associated with algorithms, processes, or operations for controlling the general functions and operations of the log server 4 in accordance with the different aspects and embodiments described in the present disclosure. The controller 41 controls the general operations of the log server 4 and can include, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the gateway/access point apparatus 2. Communication between the components (e.g., 36-41) of the log server 4 is established using the internal bus 42.

The modem/gateway device 2 can be a hardware electronic device that functions as a modem, a combined modem and router, or a combined modem, router, and gateway device for providing content received from, for example, a content provider to other network devices (e.g., client devices and/or mobile device) in one of more wireless networks (not shown).

It is also contemplated by the present disclosure that the modem/gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

As shown in FIG. 2, modem/gateway device 2 includes a user interface 20, a network interface 21, a power supply 22, a memory 24, and a controller 26. The user interface 20 can include, but is not limited to, push buttons, a keyboard, a keypad, an LCD, a CRT, a TFT, an LED, an HD or other similar display device, including a display device having touch screen capabilities so as to allow interaction between a user and the gateway/access point apparatus 2. The network interface 21 can include various network cards, and circuitry implemented in software and/or hardware to enable communications between the modem/gateway device 2 and the Internet 6 using connection 10.

The various network cards, interfaces, interfaces, and circuitry of the network interface 21 enable communications via connection 10 using a digital subscriber (DSL) connection, a cable modem connection, a broadband mobile phone network, an optical network, or other similar connections. The various network cards, interfaces, and circuitry of the network interface 21 enable communications via connection 10 using a wireless connection that operates in accordance with, but is not limited to, IEEE 802.11 protocol, a Radio Frequency For Consumer Electronics (RF4CE) protocol, ZigBee protocol, Z-Wave protocol, or IEEE 802.15.4 protocol. It is also contemplated by the present disclosure that the various network cards, interfaces, and circuitry of the network interface 21 enable communications via connection 10 using a WAN, a LAN, a VPN, MANs, PANs, WLANs, SANs, a PTSA, a global Telex network, or a 2G, 3G, 4G or 5G network.

It is also contemplated by the present disclosure that the various network cards, interfaces, and circuitry of the network interface 21 enable communications with one or more client devices and/or mobile device connected in different wireless networks using a wireless connection that operates in accordance with, but is not limited to, Bluetooth protocols (e.g., Bluetooth versions 1.0-3.0 and Bluetooth Low Energy (BLE) versions 4.0-5.0) or other short range protocols that operate in accordance with a wireless technology standard for exchanging data over short distances using short-wavelength UHF radio waves from 2.4 to 2.485 GHz.

Additionally, the various network cards, interfaces, and circuitry of the network interface 21 enable communications to one or more client devices and/or mobile device connected in different wireless networks using a wireless connection that operates in accordance with, but is not limited to, IEEE 802.11 protocol, RF4CE protocol, ZigBee protocol, Z-Wave protocol, or IEEE 802.15.4 protocol. The one or more client devices and/or mobile devices can include, but are not limited to, a computer, a portable device, an electronic tablet, a smart phone, smart speakers, IoT devices, iControl devices, or other wireless hand-held consumer electronic device capable to executing and displaying the content received through the modem/gateway device 2.

The power supply 22 supplies power to the internal components of the gateway/access point apparatus 2 through the internal bus 27. The power supply 22 can include a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery.

The memory 24 includes a single memory or one or more memories or memory locations that can include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions including software 25 associated with algorithms, processes, or operations for performing the intelligent upgrade to a debug load operation for the modem/gateway device 2 in accordance with the aspect and embodiments of the present disclosure.

For example, the memory 24 can be implemented to store an official release operating configuration and a debug load operating configuration associated with the modem/gateway device 2. The debug load operating configuration is generally used only for performing debug operations and data collection functions data, data packets, logs, log files, or other tiles) associated with the modem/gateway 2 device. On the other hand, the official release operating configuration would be implemented for the operation of the modem/gateway device 2 under normal operating conditions. The use of the official release operating configuration and the debug load operating configuration are implemented as part of the intelligent upgrade to a debug load operation for the modem/gateway device 2, which is described in detail with reference to FIG. 3.

The software 25 can support the management protocol implemented by the management server/PC 3 such as the SNMP protocol, which allows the management server/PC 3 to send queries, receive responses, set variables, and monitor and acknowledge events associated with the monitoring and management of the modem/gateway device 2 and in association with the intelligent upgrade to a debug load operation for the modem/gateway device 2. Additionally, the software 25 also includes algorithms, processes, or operations for controlling the general functions and operations of the modem/gateway device 2 for performing the functions of the different aspects and embodiments of the present disclosure.

The controller 26 controls the general operations of the modem/gateway device 2 and can include, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the gateway/access point apparatus 2. Communication between the components (e.g., 20-22, and 24-26) of the modem/gateway device 2 is established using the internal bus 27.

Figure 3:
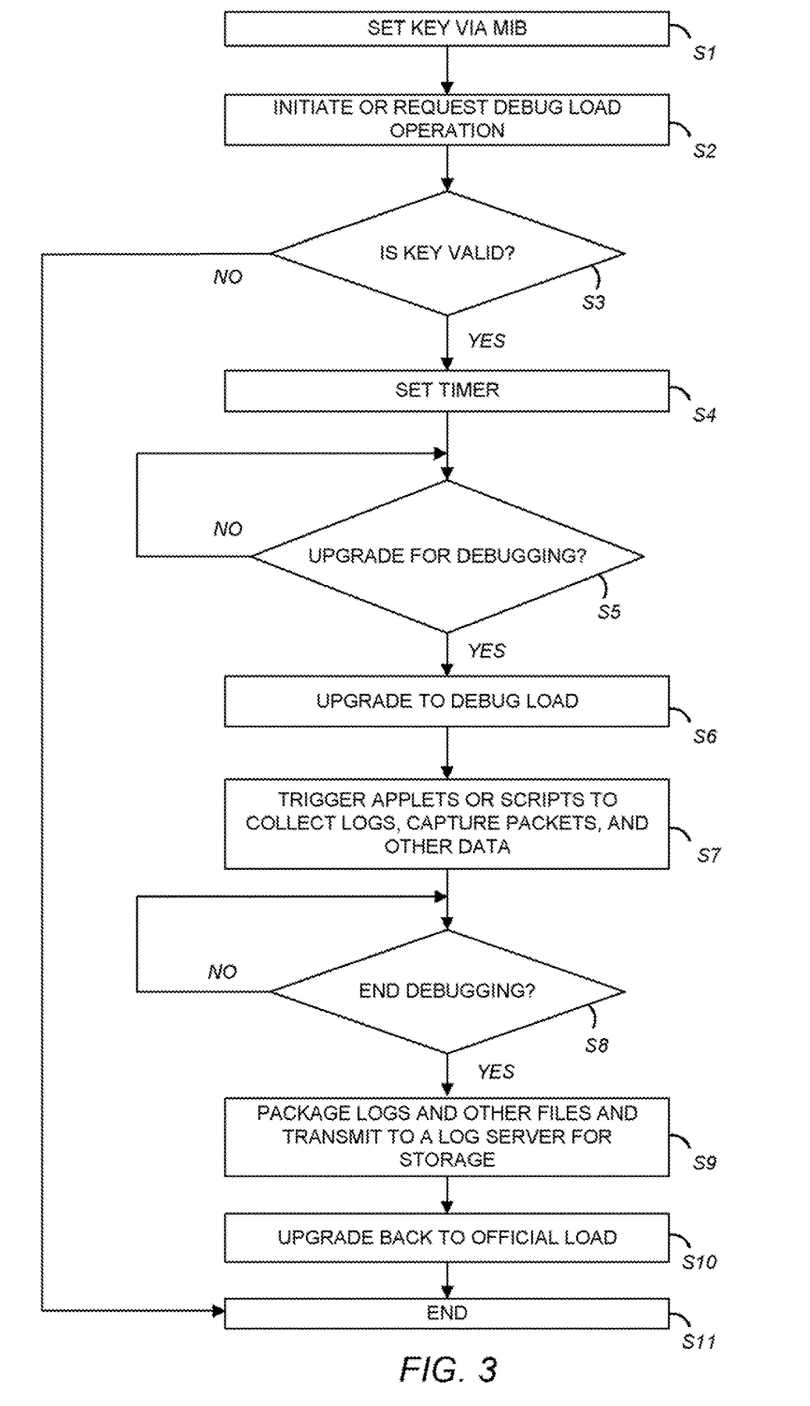
FIG. 3 illustrates a method and algorithm for performing an intelligent upgrade to a debug load operation in an electronic device according to an embodiment of the present disclosure.

FIG. 3 illustrates a method and algorithm for performing an intelligent upgrade to a debug load operation in an electronic device according to an embodiment of the present disclosure.

It is assumed that the management server/PC 3, the log server 4, and the modem/gateway device 2 include their respective software 25, 32, 40 stored in their respective memories 24, 31, 39. In FIG. 3, the method and algorithm illustrate operations performed by the management software 32 of the management server/PC 3 and the software 25 of the modem/gateway device 2 when executed b their respective controllers 26, 33 and performing the intelligent upgrade to a debug load operation for the modem/gateway device 2.

In step S1, a key is set using the MIB. The key is a variable in the MIB that implemented for defining and controlling the execution of a debug load Operation on the modem/gateway device 2. For example, management software 32 of the management server/PC 3 includes algorithms, processes, or operations for implementing a SNMP protocol such as through NET-SNMP or MG-SOFT, and the SNMP protocol is an Internet standard protocol for collecting, organizing, and modifying information for the managed devices in a network.

The management software 32 when executed by the controller 33 can be implemented for performing communicating, monitoring, and management functions using the SNMP protocol through, for example, NET-SNMP or MG-SOFT. An aspect of the SNMP protocol is active management tasks such as monitoring, management, and configuration changes, through the setting and modification of device or network variables in the MIB, which is a predefined structure that stores information such as the device or network variables that can be queried and/or set using the SNMP protocol. In step S1, the key is set as a device or network variable in the MIB using the SNMP protocol.

The key can be used to define the following features: 1) the time of upgrade to or performance of the debug load operation; 2) the time of upgrade back to or performance of the official release operation; 3) a multiple system operator (MSO) name; 4) a model number; and 5) a HASH encryption field. The key is defined and set in the MIB in advance. It is contemplated by the present disclosure that the key is not limited to defining the features noted above and the key can be used to define any number of features associated with the monitoring and management of network devices.

In step S2, a performance issue related to the modem/gateway device is detected by the management server/PC 3 and/or the modem/gateway device 2, which can initiate a request for a debug load operation. It is contemplated by the present disclosure that managed devices (e.g., router, modems, switches, servers, gateway and other similar devices) by the management server/PC 3 such as the modem/gateway device 2 include software 25, which supports the use of the same or similar protocol implemented by the management server/PC 3, such as the SNMP protocol. Communications using the SNMP protocol between the management server/PC 3 and the modem/gateway device 2 using their respective network interfaces 30, 21 and network connections 6, 10, 13, enables the modem/gateway device 2 to receive the key from the MIB for executing the debug load operation. For example, the software 32 in management server can include a NET-SNMP tool, which is used to send an SNMP request. The software 25 in the modem/gateway device 2 can include an SNMP-AGENT tool, which is used to receive the SNMP request and response it. It is contemplated by the present disclosure that the upgrade to a debug load operation can be requested or initiated by the management server/PC 3 and/or the modem/gateway device 2.

In step S3, the modem/gateway device 2 determines if the key in the NCB is valid. The key can be determined to be valid by using at least the MSO name, the model number, and the HASH encryption field in the key or other information provided in the key, which is compared to information stored in the memory 24 of modem/gateway device 2. If the key is determined not to be valid, then the modem/gateway device 2 will not execute a debug load operation and the process ends in step S11. In step S3, if the modem/gateway device 2 determines that the key is valid, then a time period or timer is set for performing the debug load operation in step S4. The time period or duration for performing the debug load operation can be determined from the information provided in the key. In steps S5, the modem/gateway device 2 determines if it is time to execute the debug load operation on the modem/gateway device 2. The time for executing the debug load operation can be determined from the information provided in the key.

In step S5, if the modem/gateway device 2 determines that it is not time to execute the debug load operation, then the modem/gateway device 2 will wait and continue to monitor the time to execute the debug load operation on the modem/gateway device 2. In step S5, if the modem/gateway device 2 determines that it is time to execute the debug load operation, then the modem/gateway device 2 will upgrade to or execute the debug load operating configuration on the modem/gateway device 2 in step S6. That is, the controller 26 will execute the software 25 stored in the memory 24 of the modem/gateway device 2 to switch from the official release operating configuration to the debug load operating configuration of the modem/gateway device 2 (i.e., upgrade to the debug load operation).

In step S7, the debug load operation on the modem/gateway device 2 will trigger the execution of applets and scripts that can collect current configuration data, data packets, logs, log files, and other data associated with the operation of the modem/gateway device 2. The applets and scripts with continue to execute and collect configuration data, data packets, logs, log files, and other data for the time period indicated by the key. In step S8, the modem/gateway device 2 will determine if the time period for execution of the debug load operation on the modem/gateway device 2 has expired, as indicated by the key. In step S8, if the modem/gateway device 2 determines that the time period for execution of the debug load operation on the modem/gateway device 2 has not expired, then the modem/gateway device 2 will wait and continue to monitor the time period for execution of the debug load operation on the modem/gateway device 2.

In step S8, if the modem/gateway device 2 determines that the time period for execution of the debug load operation on the modem/gateway device 2 has expired, then the modem/gateway device 2 will package all the configuration data, logs, log files, and other data files collected during execution of the debug load operation and transmit the packaged data to the log server 4 via the respective network interfaces 21, 37 and the connections 6, 10, 14 between the modem/gateway device 2 and the log server 4. For example, the software 25 in the modem/gateway device 2 can include a TFTP-CLIENT tool, which is used to send the collected data, logs, and other data files to the log server 4. The software 40 in log server 4 can include a TFTP-SERVER tool, which is used to receive the collected data, logs, and other data files from the modem/gateway device 2. The configuration data, data packets, logs, log files, or other files stored in the log server 4 can be accessed by, for example, technical support persons, or other administrative or management persons and/or devices. An analysis of the information stored in the log server 4 can be used to examine the operation and activities of the modem/gateway device 2 and other network devices connected in the network.

In step S10, the operating state of the modem/gateway device 2 is automatically upgraded back to the official release operating configuration from the debug, load operating configuration. That is, the controller 26 will execute the software 25 stored in the memory 24 of the modem/gateway device 2 to switch from the debug load operating configuration to the official release operating configuration of the modem/gateway device 2 (i.e., upgrade back to the official release operation). Once the modem/gateway device 2 is automatically switched back to official release operation, then the process ends in step S11.

By defining and setting a key in the MIB in advance (e.g., for implementing the execution of a debug load operation) and then validating the key at the time a performance issue is detected with a modem/gateway device, performance issues can be evaluated and addressed quickly and efficiently by implementing a debug load operation as defined by the key without requiring assistance from an engineer or PLM.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 3. For example, the one or more memories stores software or algorithms with executable instructions and the one or more processors can execute a set of instructions of the software or algorithms in association with the intelligent upgrade of a debug load operation in accordance with the aspects and embodiments of the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computes readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device for intelligent switching to a debug load operation, the electronic device comprising:
a hardware processor;
a non-transitory memory configured to store one or more programs; and
a network interface, wherein the hardware processor is configured to execute the one or more programs to:
verify validity of a key via a Management Information Base (MIB), the key being set in advance via the MIB and defining execution of the debug load operation for the electronic device;
set a time period for execution of the debug load operation, when the validity of the key is verified;
switch from an official release operation to the debug load operation on the electronic device and execute the debug load operation on the electronic device; and
automatically switch back to the official release operation from the debug load operation for the electronic device after expiration of the time period,
wherein the debug load operation collects information related to the electronic device and transmits the information to an external server for storage via the network interface.

2. The electronic device according to claim 1, wherein the key includes: 1) a time for switching to the debug load operation; 2) a time for switching back to the official release operation; 3) a Multiple System Operator (MSO) name; 4) a model number; and 5) a hash encryption field.

3. The electronic device according to claim 2 wherein the key is verified using at least the MSO name, the model number, and the hash encryption field.

4. The electronic device according to claim 1, wherein the debug load operation triggers the execution of applets or scripts for collecting the information related to the electronic device.

5. The electronic device according to claim 4, wherein the information collected by execution of the debug load includes data packets and logs related to operations of the electronic device.

6. The electronic device according to claim 1, wherein the electronic device is a cable modem and the external server is a log server.

7. The electronic device according to claim 1, wherein the hardware processor is configured to execute the one or more programs to further initiate a request for the debug load operation for the electronic device based on a performance issue related to the electronic device.

8. A system for intelligent upgrade switching to a debug load operation, the system comprising:
a management server including, a network interface, a hardware processor, and a non-transitory memory configured to store one or more programs;
an electronic device including a hardware processor, a non-transitory memory configured to store one or more programs, and a network interface;
a log server including a hardware processor, a non-transitory memory configured to store one or more programs, and a network interface; and
a network connection configure to establish a communication connection between respective network interfaces of the management server, the electronic device, and the log server,
wherein the respective hardware processors in the management server, the electronic device, and the log server execute their respective one or more programs to cause the system to:
set, using the management server, a key via a Management Information Base (MIB), the key being set in advance and defining execution of a debug load operation for the electronic device;
initiate a request for the debug load operation related to the electronic device via the network connection;
verify, in the electronic device, validity of the key via the MIB;
set, in the electronic device, a time period for execution of the debug load operation, when the validity of the key is verified;
switch, in the electronic device, from an official release operation to the debug load operation and execute the debug load operation; and
automatically switch, in the electronic device, back to the official release operation from the debug load operation after expiration of the time period, wherein the debug load operation collects information related to the electronic device and transmits the information to a log server via the network connection for storage.

9. The system according to claim 8, wherein the key includes: 1) a time for switching to the debug load operation; 2) a time for switching back to the official release operation; 3) a Multiple System Operator (MSO) name; 4) a model number; and 5) a hash encryption field.

10. The system according to claim 9, wherein the key is verified based on at least the MSO name, the model number, and the hash encryption field.

11. The system according to claim 8, wherein the debug load operation triggers the execution of applets or scripts for collecting the information related to the electronic device.

12. The system according to claim 11, wherein the information collected by execution of the debug load includes data packets and logs related to operations of the electronic device.

13. The system according to claim 8, wherein the electronic device is a cable modem.

14. A method for intelligent switching to a debug load operation for an electronic device, the method comprising:
setting a key via a Management Information Base (MIB), the key being set in advance and defining execution of a debug load operation for the electronic device;
initiating a request for the debug load operation related to the electronic device;
verifying validity of the key via the MIB;
setting a time period for execution of the debug load operation, when the validity of the key is verified;
switching from an official release operation to the debug load operation in the electronic device and executing the debug load operation; and
automatically switching back to the official release operation from the debug load operation in the electronic device after expiration of the time period,
wherein the debug load operation collects information related to the electronic device and transmits the information to an external server for storage.

15. The method according to claim 14, wherein the key includes: 1) a time for switching to the debug load operation; 2) a time to switch back to the official release operation; 3) a Multiple System Operator (MSO) name; 4) a model number; and 5) a hash encryption field, and
the verifying validity of the key includes verifying at least the MSO name, the model number, and the hash encryption field with respect to the electronic device.

16. The method according to claim 14, wherein the executing the debug load operation for the electronic device includes triggering execution of applets or scripts, and
the information collected by execution of the debug load includes data packets and logs related to operations of the electronic device.

17. The method according to claim 14, wherein the electronic device is a cable modem.

18. A non-transitory computer-readable recording medium for intelligent switching to a debug load operation for an electronic device, the non-transitory computer-readable recording medium storing one or more programs which when executed by a hardware processor performs steps comprising:
setting a key via a Management Information Base (MIB), the key being set in advance and defining execution of a debug load operation for the electronic device;
initiating a request for the debug load operation related to the electronic device;
verifying validity of the key via the MIB;
setting a time period for execution of the debug load operation, when the validity of the key is verified;
switching from an official release operation to the debug load operation in the electronic device and executing the debug load operation; and
automatically switching back to the official release operation from the debug load operation in the electronic device after expiration of the time period,
wherein the debug load operation collects information related to the electronic device and transmits the information to an external server for storage.

19. The non-transitory computer-readable recording medium according to claim 18, wherein the key includes: 1) a time to switch to the debug load operation; 2) a time to switch back to the official release operation; 3) a Multiple System Operator (MSO) name; 4) a model number; and 5) a hash encryption field, and
the verifying validity of the key includes verifying at least the MSO name, the model number, and the hash encryption field with respect to the electronic device.

20. The non-transitory computer-readable recording medium according to claim 18, wherein the executing of the debug load operation on the electronic device includes triggering execution of applets or scripts, and
the information collected by execution of the debug load includes data packets and logs related to operations of the electronic device.

\* \* \* \* \*